US007563750B2

(12) United States Patent
Eoff et al.

(10) Patent No.: US 7,563,750 B2
(45) Date of Patent: *Jul. 21, 2009

(54) METHODS AND COMPOSITIONS FOR THE DIVERSION OF AQUEOUS INJECTION FLUIDS IN INJECTION OPERATIONS

(75) Inventors: Larry S. Eoff, Duncan, OK (US); Eldon Dwyann Dalrymple, Duncan, OK (US); B. Raghava Reddy, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 270 days.

This patent is subject to a terminal disclaimer.

(21) Appl. No.: 10/763,800

(22) Filed: Jan. 24, 2004

(65) Prior Publication Data

US 2005/0164894 A1 Jul. 28, 2005

(51) Int. Cl.
*C09K 8/588* (2006.01)
*C09K 8/88* (2006.01)
*C09K 8/90* (2006.01)

(52) U.S. Cl. .................. 507/212; 507/214; 507/222; 507/244; 507/246; 507/259; 507/261; 166/305.1; 166/306

(58) Field of Classification Search ................ 507/110, 507/209, 210
See application file for complete search history.

(56) References Cited

U.S. PATENT DOCUMENTS

| | | | |
|---|---|---|---|
| 2,278,838 A | 4/1942 | Groote et al. | |
| 2,670,329 A | 2/1954 | Jones | |
| 2,689,244 A | 9/1954 | Jones | |
| 2,819,278 A | 1/1958 | De Groots et al. | |
| 2,843,573 A | 7/1958 | Melamed | 526/260 |
| 2,863,832 A | 12/1958 | Perrine | 252/8.55 |
| 2,877,179 A | 3/1959 | Hughes et al. | |
| 2,910,436 A | 10/1959 | Fatt et al. | 252/8.55 |
| 3,008,898 A | 11/1961 | Hughes et al. | |
| 3,052,298 A | 9/1962 | Mallot | |
| 3,065,247 A | 11/1962 | De Groots et al. | |
| 3,072,187 A * | 1/1963 | Carr | 166/258 |
| 3,215,199 A | 11/1965 | Dilgren | 166/38 |
| 3,251,415 A | 5/1966 | Bombardieri et al. | 166/42 |
| 3,251,778 A | 5/1966 | Dickson | 252/82 |
| 3,258,428 A | 6/1966 | Dickson | 252/180 |
| 3,265,512 A | 8/1966 | Dickson | 106/14 |
| 3,271,307 A | 9/1966 | Dickson et al. | 300/152 |
| 3,297,090 A | 1/1967 | Dilgren | 166/38 |
| 3,307,630 A | 3/1967 | Dilgren et al. | 166/38 |
| 3,326,890 A | 6/1967 | Engelskirchen et al. | |
| 3,335,794 A * | 8/1967 | Bond | 166/271 |
| 3,336,980 A | 8/1967 | Rike | |
| 3,347,789 A | 10/1967 | Dickson | 252/9.55 |
| 3,353,604 A * | 11/1967 | Gibson et al. | 166/270 |
| 3,382,924 A | 5/1968 | Veley et al. | 166/42 |
| 3,404,114 A | 10/1968 | Walter et al. | 524/812 |
| 3,434,971 A | 3/1969 | Atkins | 252/8.55 |
| 3,441,085 A | 4/1969 | Gidley | 166/307 |
| 3,451,818 A | 6/1969 | Wareham | 96/78 |
| 3,489,222 A | 1/1970 | Millhone et al. | |
| 3,500,913 A * | 3/1970 | Closmann et al. | 166/259 |
| 3,501,201 A * | 3/1970 | Closmann et al. | 299/4 |
| 3,510,167 A * | 5/1970 | Carmody | 299/4 |
| 3,601,194 A | 8/1971 | Gallus | 166/283 |
| 3,647,507 A | 3/1972 | Ashcraft | 427/288 |
| 3,647,567 A | 3/1972 | Schweri et al. | 428/463 |
| 3,689,468 A | 9/1972 | Cenci et al. | 526/312 |
| 3,708,013 A | 1/1973 | Dismukes | |
| 3,709,298 A | 1/1973 | Pramann | |
| 3,744,566 A | 7/1973 | Szabo et al. | 166/275 |
| 3,841,402 A * | 10/1974 | Knight et al. | 166/247 |
| 3,902,557 A | 9/1975 | Shaughnessy et al. | |
| 3,910,862 A | 10/1975 | Barabas et al. | 260/79.3 MU |
| 3,943,060 A | 3/1976 | Martin et al. | |
| 3,983,941 A | 10/1976 | Fitch | |
| 4,029,544 A * | 6/1977 | Jarowenko et al. | 162/175 |
| 4,052,343 A | 10/1977 | Cunningham | 521/32 |

(Continued)

FOREIGN PATENT DOCUMENTS

DE 2 250 552 4/1974

(Continued)

OTHER PUBLICATIONS

Xu, et al.., Modeling of Laser Spallation Drilling of Rocks for Gas- and Oilwell Drilling, SPE 95746, 2005.

(Continued)

*Primary Examiner*—James Seidleck
*Assistant Examiner*—John J Figueroa
(74) *Attorney, Agent, or Firm*—Robert A. Kent; Baker Botts L.L.P.

(57) ABSTRACT

An exemplary method of the present invention for performing an injection operation includes providing a water-soluble relative permeability modifier, introducing the water-soluble relative permeability modifier into a subterranean formation; and injecting an aqueous injection fluid into the subterranean formation after introducing the water-soluble relative permeability modifier. An exemplary permeability-modifying injection fluid of the present invention contains water-soluble relative permeability modifier. The water-soluble relative permeability modifiers of the present invention include hydrophobically modified water-soluble polymers, hydrophilically modified water-soluble polymers, and water-soluble polymers without hydrophobic or hydrophilic modification.

57 Claims, No Drawings

U.S. PATENT DOCUMENTS

| | | | |
|---|---|---|---|
| 4,052,345 A | 10/1977 | Austin et al. | 521/129 |
| 4,129,183 A | 12/1978 | Kalfoglou | 166/300 |
| 4,129,534 A | 12/1978 | Cunningham | 521/38 |
| 4,142,595 A | 3/1979 | Anderson et al. | 175/72 |
| 4,152,274 A | 5/1979 | Phillips et al. | 876/296 |
| 4,158,521 A | 6/1979 | Anderson et al. | 405/264 |
| 4,158,726 A | 6/1979 | Kamada et al. | 526/200 |
| 4,228,277 A | 10/1980 | Landoll | |
| 4,299,710 A | 11/1981 | Dupre et al. | 252/8.5 A |
| 4,306,981 A | 12/1981 | Blair, Jr. | |
| 4,337,828 A | 7/1982 | Blair, Jr. | |
| 4,366,071 A | 12/1982 | McLaughlin et al. | 252/8.55 R |
| 4,366,072 A | 12/1982 | McLaughlin et al. | 252/8.55 R |
| 4,366,073 A | 12/1982 | McLaughlin et al. | 252/8.55 R |
| 4,366,074 A | 12/1982 | McLaughlin et al. | 252/8.55 R |
| 4,374,739 A | 2/1983 | McLaughlin et al. | 252/8.55 R |
| 4,393,939 A | 7/1983 | Smith et al. | 166/293 |
| 4,395,340 A | 7/1983 | McLaughlin | 252/8.55 D |
| 4,401,789 A | 8/1983 | Gideon | 524/827 |
| 4,439,334 A | 3/1984 | Borchardt | 252/8.55 D |
| 4,440,649 A | 4/1984 | Loftin et al. | 252/8.5 C |
| 4,441,556 A | 4/1984 | Powers et al. | |
| 4,447,342 A | 5/1984 | Borchardt et al. | 252/8.55 D |
| 4,460,627 A | 7/1984 | Weaver et al. | 427/212 |
| 4,462,718 A | 7/1984 | McLaughlin et al. | 405/264 |
| 4,499,214 A | 2/1985 | Sortwell | |
| 4,532,052 A | 7/1985 | Weaver et al. | 252/8.55 R |
| 4,536,297 A | 8/1985 | Loftin et al. | 252/8.5 C |
| 4,536,303 A | 8/1985 | Borchardt | 252/8.55 R |
| 4,536,305 A | 8/1985 | Borchardt et al. | 252/8.55 R |
| 4,552,670 A | 11/1985 | Lipowski et al. | 704/553 |
| 4,554,081 A | 11/1985 | Borchardt et al. | 252/8.5 A |
| 4,563,292 A | 1/1986 | Borchardt | 252/8.55 R |
| 4,604,216 A | 8/1986 | Irvin et al. | 252/8.51 |
| 4,608,139 A | 8/1986 | Craun et al. | 428/457 |
| 4,619,776 A | 10/1986 | Mondshine | |
| 4,627,926 A | 12/1986 | Peiffer et al. | 252/8.55 R |
| 4,662,448 A | 5/1987 | Ashford et al. | |
| 4,671,883 A | 6/1987 | Connell | 252/8.515 |
| 4,679,625 A * | 7/1987 | Gibbons | 166/270 |
| 4,693,639 A | 9/1987 | Hollenbeak et al. | 405/263 |
| 4,699,722 A | 10/1987 | Dymond et al. | 252/8.551 |
| 4,702,319 A | 10/1987 | Bock et al. | |
| 4,730,028 A | 3/1988 | Bock et al. | 526/225 |
| 4,814,096 A * | 3/1989 | Evani | 507/224 |
| 4,828,725 A | 5/1989 | Lai et al. | |
| 4,828,726 A | 5/1989 | Himes et al. | 252/8.553 |
| 4,856,590 A | 8/1989 | Caillier | |
| 4,870,167 A | 9/1989 | Zody et al. | |
| 4,941,537 A | 7/1990 | Langemeier et al. | |
| 4,956,104 A | 9/1990 | Cowan et al. | |
| 4,959,432 A | 9/1990 | Fan et al. | 526/287 |
| 4,960,876 A | 10/1990 | Molteni et al. | |
| 5,051,197 A | 9/1991 | Kalfayan et al. | |
| 5,071,934 A | 12/1991 | Peiffer | 526/307 |
| 5,097,904 A | 3/1992 | Himes | 166/294 |
| 5,105,886 A | 4/1992 | Strubhar et al. | |
| 5,146,986 A | 9/1992 | Dalrymple | 166/294 |
| 5,160,642 A | 11/1992 | Schield et al. | 252/8.551 |
| 5,197,544 A | 3/1993 | Himes | 166/294 |
| 5,208,216 A | 5/1993 | Williamson et al. | 507/120 |
| 5,244,042 A | 9/1993 | Dovan et al. | 166/270 |
| 5,248,665 A | 9/1993 | Hale et al. | |
| 5,256,651 A | 10/1993 | Phelps et al. | |
| 5,271,466 A | 12/1993 | Harms | 166/300 |
| 5,342,530 A | 8/1994 | Aften et al. | 252/8.551 |
| 5,379,841 A | 1/1995 | Pusch et al. | 166/295 |
| 5,382,371 A | 1/1995 | Stahl et al. | 507/221 |
| 5,424,284 A | 6/1995 | Patel et al. | |
| 5,445,223 A | 8/1995 | Nelson et al. | |
| 5,473,059 A | 12/1995 | Yeh | |
| 5,597,783 A | 1/1997 | Audibert et al. | 507/120 |
| 5,607,902 A | 3/1997 | Smith et al. | 507/120 |
| 5,637,556 A | 6/1997 | Argillier et al. | 507/120 |
| 5,643,460 A | 7/1997 | Marble et al. | |
| 5,646,093 A | 7/1997 | Dino | 507/209 |
| 5,669,456 A | 9/1997 | Audibert et al. | 175/72 |
| 5,681,796 A | 10/1997 | Nimerick | |
| 5,704,426 A | 1/1998 | Rytlewski et al. | |
| 5,711,376 A * | 1/1998 | Sydansk | 166/308.6 |
| 5,720,347 A | 2/1998 | Audibert et al. | 166/294 |
| 5,728,653 A | 3/1998 | Audibert et al. | 507/222 |
| 5,735,349 A | 4/1998 | Dawson et al. | 166/295 |
| 5,887,653 A | 3/1999 | Bishop et al. | 166/281 |
| 5,908,814 A | 6/1999 | Patel et al. | |
| 5,944,106 A | 8/1999 | Dalrymple et al. | 166/281 |
| 5,972,848 A | 10/1999 | Audibert et al. | 507/119 |
| 5,979,557 A | 11/1999 | Card et al. | 166/300 |
| 5,990,052 A | 11/1999 | Harris | |
| 6,020,289 A | 2/2000 | Dymond | 507/120 |
| 6,070,664 A | 6/2000 | Dalrymple et al. | 166/281 |
| 6,124,245 A | 9/2000 | Patel | 507/120 |
| 6,187,839 B1 | 2/2001 | Eoff et al. | 523/130 |
| 6,194,356 B1 | 2/2001 | Jones et al. | |
| 6,209,646 B1 | 4/2001 | Reddy et al. | |
| 6,228,812 B1 | 5/2001 | Dawson et al. | 507/221 |
| 6,237,687 B1 | 5/2001 | Barbee, Jr. et al. | 166/278 |
| 6,242,390 B1 | 6/2001 | Mitchell et al. | |
| 6,248,697 B1 * | 6/2001 | Goodhue et al. | 507/140 |
| 6,253,851 B1 | 7/2001 | Schroeder, Jr. et al. | 166/278 |
| 6,277,900 B1 | 8/2001 | Oswald et al. | 523/130 |
| 6,281,172 B1 | 8/2001 | Warren et al. | |
| 6,283,210 B1 | 9/2001 | Soliman et al. | 166/270 |
| 6,291,404 B2 | 9/2001 | House | |
| 6,358,889 B2 * | 3/2002 | Waggenspack et al. | 507/110 |
| 6,359,047 B1 | 3/2002 | Thieu et al. | 524/376 |
| 6,364,016 B1 | 4/2002 | Dalrymple et al. | 166/270 |
| 6,380,137 B1 | 4/2002 | Heier et al. | 507/121 |
| 6,476,169 B1 | 11/2002 | Eoff et al. | 523/307.2 |
| 6,476,283 B1 | 11/2002 | Devore et al. | 585/250 |
| 6,497,283 B1 | 12/2002 | Eoff et al. | 166/293 |
| 6,516,885 B1 | 2/2003 | Munday | 166/295 |
| 6,562,762 B2 | 5/2003 | Cowan et al. | |
| 6,569,983 B1 | 5/2003 | Treybig et al. | 528/102 |
| 6,601,648 B2 | 8/2003 | Ebinger | |
| 6,607,035 B1 * | 8/2003 | Reddy et al. | 166/295 |
| 6,609,578 B2 | 8/2003 | Patel et al. | 175/64 |
| 6,626,241 B2 | 9/2003 | Nguyen | |
| 6,627,719 B2 | 9/2003 | Whipple et al. | 774/325 |
| 6,637,517 B2 | 10/2003 | Samuel et al. | |
| 6,656,885 B2 * | 12/2003 | House et al. | 507/110 |
| 6,662,874 B2 | 12/2003 | Surjaatmadja et al. | |
| 6,710,107 B2 | 3/2004 | Audibert et al. | 524/5 |
| 6,723,683 B2 * | 4/2004 | Crossman et al. | 507/111 |
| 6,743,288 B2 | 6/2004 | Eoff et al. | 106/724 |
| 6,764,981 B1 * | 7/2004 | Eoff et al. | 507/110 |
| 6,767,867 B2 | 7/2004 | Chatterji et al. | 507/216 |
| 6,767,869 B2 | 7/2004 | DiLullo et al. | |
| 6,780,822 B2 * | 8/2004 | Cowan et al. | 507/110 |
| 6,787,506 B2 | 9/2004 | Blair et al. | 507/222 |
| 6,790,812 B2 | 9/2004 | Halliday et al. | |
| 6,803,348 B2 | 10/2004 | Jones et al. | 507/221 |
| 6,846,420 B2 * | 1/2005 | Reddy et al. | 210/710 |
| 6,855,672 B2 | 2/2005 | Poelker | 507/225 |
| 6,884,760 B1 | 4/2005 | Brand et al. | |
| 6,962,203 B2 | 11/2005 | Funchess | |
| 6,978,836 B2 | 12/2005 | Nguyen et al. | |
| 6,981,552 B2 * | 1/2006 | Reddy et al. | 166/294 |
| 7,007,752 B2 * | 3/2006 | Reddy et al. | 166/285 |
| 7,008,908 B2 | 3/2006 | Chan et al. | |
| 7,036,587 B2 * | 5/2006 | Munoz et al. | 166/279 |
| 7,081,439 B2 * | 7/2006 | Sullivan et al. | 507/269 |
| 7,091,159 B2 | 8/2006 | Eoff et al. | |
| 7,114,568 B2 | 10/2006 | Eoff et al. | |

| | | | |
|---|---|---|---|
| 7,117,942 B2 | 10/2006 | Dalrymple et al. | |
| 7,159,656 B2 | 1/2007 | Eoff et al. | |
| 7,182,136 B2 | 2/2007 | Dalrymple et al. | |
| 7,207,387 B2 | 4/2007 | Eoff et al. | |
| 7,216,707 B2 | 5/2007 | Eoff et al. | |
| 7,220,708 B2 | 5/2007 | Zamora et al. | |
| 2002/0123433 A1* | 9/2002 | Goodhue et al. | 507/140 |
| 2003/0013871 A1* | 1/2003 | Mallon et al. | 536/84 |
| 2003/0019627 A1 | 1/2003 | Qu et al. | 166/281 |
| 2003/0104948 A1 | 6/2003 | Poelker et al. | 507/100 |
| 2003/0114317 A1 | 6/2003 | Benton et al. | |
| 2003/0191030 A1 | 10/2003 | Blair et al. | 507/225 |
| 2004/0045712 A1 | 3/2004 | Eoff et al. | |
| 2004/0102331 A1 | 5/2004 | Chan et al. | 507/100 |
| 2004/0171495 A1 | 9/2004 | Eoff et al. | |
| 2004/0220058 A1 | 11/2004 | Eoff et al. | 507/200 |
| 2004/0229756 A1* | 11/2004 | Eoff et al. | 507/219 |
| 2004/0229757 A1 | 11/2004 | Eoff et al. | 507/219 |
| 2005/0000694 A1 | 1/2005 | Eoff et al. | |
| 2005/0107503 A1* | 5/2005 | Couillet et al. | 524/249 |
| 2005/0155796 A1 | 7/2005 | Eoff et al. | |
| 2005/0178549 A1 | 8/2005 | Eoff et al. | |
| 2005/0194140 A1 | 9/2005 | Dalrymple et al. | |
| 2005/0199396 A1 | 9/2005 | Sierra et al. | |
| 2005/0230114 A1 | 10/2005 | Eoff et al. | |
| 2005/0230116 A1 | 10/2005 | Eoff et al. | |
| 2005/0279502 A1 | 12/2005 | Eoff et al. | |
| 2005/0284632 A1 | 12/2005 | Dalrymple et al. | |
| 2006/0124309 A1 | 6/2006 | Nguyen et al. | |
| 2006/0137875 A1 | 6/2006 | Dusterhoft et al. | |
| 2006/0234874 A1 | 10/2006 | Eoff et al. | |
| 2006/0240994 A1 | 10/2006 | Eoff et al. | |
| 2006/0266522 A1 | 11/2006 | Eoff et al. | |
| 2006/0283592 A1 | 12/2006 | Sierra et al. | |
| 2007/0012445 A1 | 1/2007 | Nguyen et al. | |
| 2008/0110624 A1 | 5/2008 | Nguyen et al. | |

FOREIGN PATENT DOCUMENTS

| | | |
|---|---|---|
| EP | 0 383 337 A2 | 8/1990 |
| EP | 0 896 122 A2 | 2/1999 |
| EP | 1 033 378 A1 | 9/2000 |
| EP | 1 193 365 A1 | 4/2002 |
| EP | 1 312 753 A1 | 5/2003 |
| GB | 2 221 940 A | 2/1990 |
| GB | 2335428 A | 9/1999 |
| WO | WO 93/15164 | 8/1993 |
| WO | WO 99/49183 | 9/1999 |
| WO | WO 99/50530 | 10/1999 |
| WO | WO 00/78890 | 12/2000 |
| WO | WO 02/097236 A1 | 12/2002 |
| WO | WO 03/056130 * | 5/2003 |
| WO | WO 03/056130 | 7/2003 |
| WO | WO 2004/022667 A1 | 7/2003 |
| WO | WO 2004/094781 | 11/2004 |
| WO | WO 2004/101706 A1 | 11/2004 |

OTHER PUBLICATIONS

Gahan, et al., Effect of Downhole Pressure Conditions on High-Power Laser Perforation, SPE 97093, 2005.
Gahan, et al., Analysis of Efficient High-Power Fiber Lasers of Well Perforation, SPE 90661, 2004.
Parker et al., Well Perforation Using High-Power Lasers, SPE 84418, 2003.
Parker, et al., Laser Drilling: Effects of Beam Application Methods on Improving Rock Removal, SPE 84353, 2003.
Bai, et al., Improved Determination of Stree-Dependent Permeability for Anisotropic Formations, SPE 78188, 2002.
Proett, et al., Advanced Permeability and Anisotropy Measurements While Testing and Sampling in Real-Time Using a Dual Probe Formation Tester, SPE 62919, 2000.
Proett, et al., Advanced Dual Probe Formation Tester With Transient, Harmonic, and Pulsed Time-Delay Testing Methods Determines Permeability, Skin and Anisotropy, SPE 64650, 2000.
Inikori, Solomon Ovueferaye, *Numerical Study of Water Coning Control with Downhole Water Sink (DWS) Well Completions in Vertical and Horizontal Wells*, A Disseration, Aug. 2002, Title Page, Contents, Abstract and pp. 17-18, Submitted to the Graduate Faculty of the Louisiana State University and Agricultural and Mechanical College, The Department of Petroleum Enginnering.
Zhou, Z. J., et al, *Controlling Formation Damage Using Clay Stabilizers: A Review*, Paper 95-71, The Petroleum Society of CIM, 1995, presented at the 46th Annual Technical Meeting of the Petroleum Society of CIM in Banff, Alberta, Canada, May 14-17.
Halliburton, 2001 Press Releases, *Halliburton Technology Uses Revolutionary Polymer System to Control Unwanted Water Production*, 2002 Halliburton, pp. 1-2, printed from website @ www.halliburton.com/news/archive/2001/esgnws_053101.jsp?printMe.
Halliburton, 2001 Press Releases, *First Halliburton H2Zero™ Conformance Solution Job Performed for a Producing Well in Egypt*, 2002 Halliburton, pp. 1-2, printed from website @ www.halliburton.com/news/archive/2001/esgnws_111901.jsp.
Halliburton, 2001 Press Releases, *Halliburton Performs First H2Zero™ Conformance Solution Job in North America*, 2002 Halliburton, pp. 1-2, printed from website @ www.halliburton.com/news/archive/2001/esgnws_082201.jsp.
BJ Services Company, *Aquacon, Product Inforamtion*, Aug. 1, 2001, pp. 1-2.
BJ Services Company, *Aquatrol I, Product Information*, Dec. 14, 2000, pp. 1-2.
Botermans, C. Wouter, et al, *Relative Permeability Modifiers: Myth or Reality?*, SPE No. 68973, 2001, Society of Petroleum Engineers, Inc., presented at SPE European Formation Damage Conference, The Hague, The Netherlands, May 21-22, pp. 1-13 (previously listed as website address, SPE eLibrary).
Eoff, Larry, et al, *Structure and Process Optimization for the Use of a Polymeric Relative-Permeability Modifier in Conformance Control*, SPE No. 64985, 2001, Society of Petroleum Engineers, Inc., presented at SPE International Symposium on Oilfield Chemistry, Houston, TX, Feb. 13-16, pp. 1-14 (previously listed as website address, SPE eLibrary).
Batarseh, et al., *Well Perforation Using High-Power Lasers*, SPE 84418, 2003, Society of Petroleum Engineers Inc., presented at the SPE Annual Technical Conference and Exhibition held in Denver, Colorado, Oct. 5-8, 2003, printed from website @ http://speonline.spe.org.
U.S. Appl. No. 12/080,647, filed Apr. 4, 2008.

* cited by examiner

METHODS AND COMPOSITIONS FOR THE DIVERSION OF AQUEOUS INJECTION FLUIDS IN INJECTION OPERATIONS

BACKGROUND OF THE INVENTION

The present invention relates to compositions and methods useful in injection operations. More particularly, the present invention relates to fluids comprising water-soluble relative permeability modifiers and methods of using such fluids to divert aqueous fluids in injection operations.

Generally, in the recovery of hydrocarbons (e.g., oil) from a subterranean formation, the energy required to force the hydrocarbons into producing wells may be supplied by the natural pressure drive existing in the formation or by mechanically lifting hydrocarbons from the subterranean formation through the wells bores of producing wells to the surface. But at the end of primary recovery operations, a substantial quantity of hydrocarbons may remain in the subterranean formation. Thus, secondary recovery methods, such as injection operations, may be used. For example, in injection operations the energy for producing the remaining hydrocarbons from the subterranean formation may be supplied by the injection of fluids into the formation under pressure through one or more injection wells penetrating the formation, whereby the injection fluids drive the hydrocarbons to one or more producing wells penetrating the formation. Suitable injection fluids include, among other things, water, steam, carbon dioxide, and natural gas. The sweep efficiency of injection operations, however, may vary greatly depending on a number of factors, such as variability in the permeability of the formation. In particular, where the subterranean formation contains high permeability zones, the injection fluids may flow through the areas of least resistance, e.g., through the high permeability zones, thereby bypassing less permeable zones. While injection operations may provide the energy necessary to produce hydrocarbons from the high permeability zones, hydrocarbons contained within less permeable zones may not be driven to the one or more production wells penetrating the formation.

A variety of techniques have been attempted to improve the efficiency of injection operations. One such technique, known as "polymer flooding" comprises the addition of water-soluble polymers, such as polyacrylamide, to the injection fluid, inter alia, in order to achieve a higher viscosity injection fluid. A higher viscosity injection fluid may result in a better sweep efficiency of the injection fluid in the displacement of hydrocarbons through the formation because the viscosified injection fluid may be less likely to by-pass the hydrocarbons, leaving them behind in the formation. One drawback to this technique is that despite the increased viscosity, the polymer flood may still flow through the high permeability zones, bypassing the oil contained within less permeable zones of the formation.

Another technique to increase the efficiency of injection operations has involved the injection of a sealant, such as polymer gels, into the subterranean formation so as to plug off the high permeability zones. Thus, the flow of the injection fluids may be diverted from the high permeability zones to less permeable zones. The use of these water-blocking techniques, however, may be problematic. For example, plugging off the high permeability zones may not be suitable unless the sealant can be injected solely into the offending high permeability zones therein. Furthermore, techniques geared toward injecting sealant designed to plug off the high permeability zones are limited because they may require expensive zonal isolation. Zonal isolation also may be inaccurate, which may lead to inadvertently plugging and/or damaging additional zones other than the high permeability zone.

SUMMARY OF THE INVENTION

The present invention relates to compositions and methods useful in injection operations. More particularly, the present invention relates to fluids comprising water-soluble relative permeability modifiers and methods of using such fluids to divert aqueous fluids in injection operations.

An exemplary method of the present invention for performing an injection operation comprises: introducing a water-soluble relative permeability modifier comprising a hydrophobically modified water-soluble polymer into a subterranean formation; and injecting an aqueous injection fluid into the subterranean formation after introducing the water-soluble relative permeability modifier.

Another exemplary method of the present invention for performing an injection operation comprises: introducing a water-soluble relative permeability modifier comprising a hydrophilically modified water-soluble polymer into a subterranean formation; and injecting an aqueous injection fluid into the subterranean formation after introducing the water-soluble relative permeability modifier.

Another exemplary method of the present invention for performing an injection operation comprises: providing a water-soluble relative permeability modifier comprising a water-soluble polymer without hydrophobic or hydrophilic modification; introducing the water-soluble relative permeability modifier into a subterranean formation; and injecting an aqueous injection fluid into the subterranean formation after introducing the water-soluble relative permeability modifier.

An exemplary embodiment of a permeability-modifying treatment fluid of the present invention comprises a water-soluble relative permeability modifier comprising a hydrophobically modified water-soluble polymer.

Another exemplary embodiment of a permeability-modifying treatment fluid of the present invention comprises a water-soluble relative permeability modifier comprising a hydrophilically modified water-soluble polymer.

Another exemplary embodiment of a permeability-modifying treatment fluid of the present invention comprises a water-soluble polymer without hydrophilic or hydrophobic modification.

The features and advantages of the present invention will be readily apparent to those skilled in the art upon a reading of the description of the exemplary embodiments which follows.

DESCRIPTION OF EXEMPLARY EMBODIMENTS

The present invention relates to compositions and methods useful in injection operations. More particularly, the present invention relates to fluids comprising water-soluble relative permeability modifiers and methods of using such fluids to divert aqueous fluids in injection operations. As used herein, "relative permeability modifier" refers to a compound that is capable of reducing the permeability of a subterranean formation to aqueous-based fluids without substantially changing its permeability to hydrocarbons.

In certain embodiments of the present invention, the water-soluble relative permeability modifiers comprise a hydrophobically modified water-soluble polymer. As used herein, "hydrophobically modified" refers to the incorporation into the hydrophilic polymer structure of hydrophobic groups, wherein the alkyl chain length is from about 4 to about 22 carbons. In another embodiment of the present invention, the water-soluble relative permeability modifiers comprise a hydrophilically modified water-soluble polymer. As used herein, "hydrophilically modified" refers to the incorporation into the hydrophilic polymer structure of hydrophilic groups. In yet another embodiment of the present invention, the water-soluble relative permeability modifiers comprise a water-soluble polymer without hydrophobic or hydrophilic modification.

The hydrophobically modified water-soluble polymers used in the present invention typically have a molecular weight in the range of from about 100,000 to about 10,000,000. In exemplary embodiments, the hydrophobically modified water-soluble polymers may comprise a polymer backbone comprising polar heteroatoms. Generally, the polar heteroatoms present within a polymer backbone of the hydrophobically modified water-soluble polymer include, but are not limited to, oxygen, nitrogen, sulfur, or phosphorous.

In certain embodiments of the present invention, the hydrophobically modified water-soluble polymers may be a reaction product of a hydrophilic polymer and a hydrophobic compound that are capable of reacting with each other. Such hydrophobically modified water-soluble polymers may be prereacted before they are placed into the subterranean formation or they may be formed by appropriate reaction in situ.

The hydrophilic polymers suitable for forming the hydrophobically modified water-soluble polymers used in the present invention should be capable of reacting with hydrophobic compounds. Suitable hydrophilic polymers include, homo-, co-, or terpolymers such as, but not limited to, polyvinylamines, poly(vinylamines/vinyl alcohols), and alkyl acrylate polymers in general. Additional examples of alkyl acrylate polymers include, but are not limited to, polydimethylaminoethyl methacrylate, polydimethylaminopropyl methacrylamide, poly(acrylamide/dimethylaminoethyl methacrylate), poly(methacrylic acid/dimethylaminoethyl methacrylate), poly(2-acrylamido-2-methyl propane sulfonic acid/dimethylaminoethyl methacrylate), poly(acrylamide/dimethylaminopropyl methacrylamide), poly (acrylic acid/dimethylaminopropyl methacrylamide), and poly(methacrylic acid/dimethylaminopropyl methacrylamide). In certain embodiments, the hydrophilic polymers contain reactive amino groups in the polymer backbone or as pendant groups, which are capable of reacting with hydrophobic compounds. In an exemplary embodiment, the hydrophilic polymers comprise dialkyl amino pendant groups. In an exemplary embodiment, the hydrophilic polymers comprise a dimethyl amino pendant group and at least one monomer comprising dimethylaminoethyl methacrylate or dimethylaminopropyl methacrylamide.

In certain exemplary embodiments, the hydrophilic polymers may comprise a polymer backbone comprising polar heteroatoms, wherein the polar heteroatoms present within a polymer backbone of the hydrophilic polymers include, but are not limited to, oxygen, nitrogen, sulfur, or phosphorous. Suitable hydrophilic polymers comprising polar heteroatoms within a polymer backbone include homo-, co-, or terpolymers such as, but not limited to, celluloses, chitosans, polyamides, polyetheramines, polyethyleneimines, polyhydroxyetheramines, polylysines, polysulfones, and starches. In an exemplary embodiment, the starch is a cationic starch. A suitable cationic starch may be formed by reacting a starch, such as corn, maize, waxy maize, potato, tapioca, and the like, with the reaction product of epichlorohydrin and trialkylamine.

The hydrophobic compounds that are capable of reacting with the hydrophilic polymers of the present invention include, but are not limited to, alkyl halides, sulfonates, sulfates, and organic acid derivatives. Examples of suitable organic acid derivatives include, but are not limited to, octenyl succinic acid; dodecenyl succinic acid; and anhydrides, esters, and amides of octenyl succinic acid or dodecenyl succinic acid. In certain exemplary embodiments, the hydrophobic compounds may have an alkyl chain length of from about 4 to about 22 carbons. For example, where the hydrophobic compound is an alkyl halide, the reaction between the hydrophobic compound and hydrophilic polymer may result in the quaternization of at least some of the hydrophilic polymer amino groups with an alkyl halide, wherein the alkyl chain length is from about 4 to about 22 carbons.

In other exemplary embodiments, the hydrophobically modified water-soluble polymers used in the present invention may be prepared from the polymerization reaction of at least one hydrophilic monomer and at least one hydrophobically modified hydrophilic monomer. Examples of suitable methods of their preparation are described in U.S. Pat. No. 6,476,169, the relevant disclosure of which is incorporated herein by reference.

A variety of hydrophilic monomers may be used to form the hydrophobically modified water-soluble polymers useful in the present invention. Examples of suitable hydrophilic monomers include, but are not limited to homo-, co-, and terpolymers of acrylamide, 2-acrylamido-2-methyl propane sulfonic acid, N,N-dimethylacrylamide, vinyl pyrrolidone, dimethylaminoethyl methacrylate, acrylic acid, dimethylaminopropylmethacrylamide, vinyl amine, vinyl acetate, trimethylammoniumethyl methacrylate chloride, methacrylamide, hydroxyethyl acrylate, vinyl sulfonic acid, vinyl phosphonic acid, methacrylic acid, vinyl caprolactam, N-vinylformamide, N,N-diallylacetamide, dimethyldiallyl ammonium halide, itaconic acid, styrene sulfonic acid, methacrylamidoethyltrimethyl ammonium halide, quaternary salt derivatives of acrylamide, and quaternary salt derivatives of acrylic acid.

A variety of hydrophobically modified hydrophilic monomers also may be used to form the hydrophobically modified water-soluble polymers useful in the present invention. Examples of suitable hydrophobically modified hydrophilic monomers include, but are not limited to, alkyl acrylates, alkyl methacrylates, alkyl acrylamides, alkyl methacrylamides alkyl dimethylammoniumethyl methacrylate halides, and alkyl dimethylammoniumpropyl methacrylamide halides, wherein the alkyl groups have from about 4 to about 22 carbon atoms. In an exemplary embodiment, the hydrophobically modified hydrophilic monomer comprises octadecyldimethylammoniumethyl methacrylate bromide, hexadecyldimethylammoniumethyl methacrylate bromide, hexadecyldimethylammoniumpropyl methacrylamide bromide, 2-ethylhexyl methacrylate, or hexadecyl methacrylamide.

The hydrophobically modified water-soluble polymers formed from the above-described polymerization reaction may have estimated molecular weights in the range of from about 100,000 to about 10,000,000 and mole ratios of the hydrophilic monomer(s) to the hydrophobically modified hydrophilic monomer(s) in the range of from about 99.98:0.02 to about 90:10. Suitable hydrophobically modified water-soluble polymers having molecular weights and mole ratios in the ranges set forth above include, but are not limited to, acrylamide/octadecyldimethylammoniumethyl methacrylate bromide copolymer, dimethylaminoethyl methacrylate/hexadecyldimethylammoniumethyl methacrylate bromide copolymer, dimethylaminoethyl methacrylate/vinyl pyrrolidone/hexadecyldimethylammoniumethyl methacrylate bromide terpolymer and acrylarnide/2-acrylarnido-2-methyl propane sulfonic acid/2-ethylhexyl methacrylate terpolymer.

In another embodiment of the present invention, the water-soluble relative permeability modifiers comprise a hydrophilically modified water-soluble polymer. The hydrophilically modified water-soluble polymers used in the present invention typically have a molecular weight in the range of from about 100,000 to about 10,000,000. In an exemplary embodiment, the hydrophilically modified water-soluble polymers comprise a polymer backbone comprising polar heteroatoms. Generally, the polar heteroatoms present within a polymer backbone of the hydrophilically modified water-soluble polymers include, but are not limited to, oxygen, nitrogen, sulfur, or phosphorous.

In one embodiment of the present invention, the hydrophilically modified water-soluble polymers may be a reaction product of a hydrophilic polymer and a hydrophilic compound that are capable of reacting with each other. Such hydrophilically modified water-soluble polymer may be pre-reacted before they are placed into the subterranean formation or they may be formed by appropriate reaction in situ.

The hydrophilic polymers suitable for forming the hydrophilically modified water-soluble polymers used in the present invention should be capable of reacting with hydrophilic compounds. In certain exemplary embodiments, suitable hydrophilic polymers include, homo-, co-, or terpolymers such as, but not limited to, polyvinylamines, poly(vinylamines/vinyl alcohols), and alkyl acrylate polymers in general. Additional examples of alkyl acrylate polymers include, but are not limited to, polydimethylaminoethyl methacrylate, polydimethylaminopropyl methacrylamide, poly(acrylamide/dimethylaminoethyl methacrylate), poly(methacrylic acid/dimethylaminoethyl methacrylate), poly(2-acrylamido-2-methyl propane sulfonic acid/dimethylaminoethyl methacrylate), poly(acrylamide/dimethylaminopropyl methacrylamide), poly (acrylic acid/dimethylaminopropyl methacrylamide), and poly(methacrylic acid/dimethylaminopropyl methacrylamide). In certain embodiments, the hydrophilic polymer contains reactive amino groups in the polymer backbone or as pendant groups, which are capable of reacting with hydrophilic compounds. In an exemplary embodiment, the hydrophilic polymers comprise dialkyl amino pendant groups. In an exemplary embodiment, the hydrophilic polymers comprise a dimethyl amino pendant group and at least one monomer comprising dimethylaminoethyl methacrylate or dimethylaminopropyl methacrylamide.

In other exemplary embodiments of the present invention, the hydrophilic polymers comprise a polymer backbone comprising polar heteroatoms, wherein the polar heteroatoms present within a polymer backbone of the hydrophilic polymers include, but are not limited to, oxygen, nitrogen, sulfur, or phosphorous. Suitable hydrophilic polymers comprising polar heteroatoms within a polymer backbone include homo-, co-, or terpolymers such as, but not limited to, celluloses, chitosans, polyamides, polyetheramines, polyethyleneimines, polyhydroxyetheramines, polylysines, polysulfones, and starches. In an exemplary embodiment, the starch is a cationic starch. A suitable cationic starch may be formed by reacting a starch, such as corn, maize, waxy maize, potato, tapioca, and the like, with the reaction product of epichlorohydrin and trialkylamine.

The hydrophilic compounds suitable for reaction with the hydrophilic polymers include polyethers comprising halogen; sulfonates; sulfates; and organic acid derivatives. Examples of suitable polyethers include, but are not limited to, polyethylene oxides, polypropylene oxides, polybutylene oxides, and mixtures thereof. Examples of suitable organic acid derivatives include, but are not limited to, octenyl succinic acid; dodecenyl succinic acid; and anhydrides, esters, and amides of octenyl succinic acid or dodecenyl succinic acid. In an exemplary embodiment, the polyether comprises an epichlorohydrin terminated polyethylene oxide methyl ether.

The hydrophilically modified water-soluble polymers formed from the reaction of a hydrophilic polymer with a hydrophilic compound may have estimated molecular weights in the range of from about 100,000 to about 10,000,000 and may have weight ratios of the hydrophilic polymers to the polyethers in the range of from about 1:1 to about 10:1. Suitable hydrophilically modified water-soluble polymers having molecular weights and weight ratios in the ranges set forth above include, but are not limited to, the reaction product of polydimethylaminoethyl methacrylate with epichlorohydrin terminated polyethyleneoxide methyl ether; the reaction product of polydimethylaminopropyl methacrylamide with epichlorohydrin terminated polyethyleneoxide methyl ether; and the reaction product of poly(acrylamide/dimethylaminopropyl methacrylamide) with epichlorohydrin terminated polyethyleneoxide methyl ether. In an exemplary embodiment, the hydrophilically modified water-soluble polymers comprise the reaction product of a polydimethylaminoethyl methacrylate with epichlorohydrin terminated polyethyleneoxide methyl ether having a weight ratio of polydimethylaminoethyl methacrylate to epichlorohydrin terminated polyethyleneoxide methyl ether of 3:1.

In another embodiment of the present invention, the water-soluble relative permeability modifiers comprise a water-soluble polymer without hydrophobic or hydrophilic modification. Examples of suitable water-soluble polymers include, but are not limited to, homo-, co-, and terpolymers of acrylamide, 2-acrylamido-2-methyl propane sulfonic acid, N,N-dimethylacrylamide, vinyl pyrrolidone, dimethylaminoethyl methacrylate, acrylic acid, dimethylaminopropylmethacrylamide, vinyl amine, vinyl acetate, trimethylammoniumethyl methacrylate chloride, methacrylamide, hydroxyethyl acrylate, vinyl sulfonic acid, vinyl phosphonic acid, methacrylic acid, vinyl caprolactam, N-vinylformamide, N,N-diallylacetamide, dimethyldiallyl ammonium halide, itaconic acid, styrene sulfonic acid, methacrylamidoethyltrimethyl ammonium halide, quaternary salt derivatives of acrylamide and quaternary salt derivatives of acrylic acid.

Among other things, the water-soluble relative permeability modifiers of the present invention when placed into a subterranean zone may provide improved efficiency of injection operations by the diversion of aqueous injection fluids. It is believed that the water-soluble relative permeability modifier, among other things, may attach to surfaces within the subterranean formation. The presence of the water-soluble relative permeability modifier in the subterranean formation may reduce the permeability of the treated zones to aqueous-based fluids without substantially changing its permeability to hydrocarbons. By this modification of the permeability of the treated zones, it is believed that the water-soluble relative permeability modifier may, inter alia, divert aqueous injection fluids injected into the formation during subsequent injection operations to other zones of the formation, e.g., from high permeability zones of the formation to less permeable zones.

In certain embodiments of the present invention, the water-soluble relative permeability modifiers are provided as part of a permeability-modifying injection fluid. The permeability-modifying injection fluids of the present invention generally comprise an aqueous injection fluid and a water-soluble relative permeability modifier.

The aqueous injection fluid used in permeability-modifying injection fluids of the present invention may be any aqueous-based fluid that is suitable for use in injection operations that does not adversely react with the water-soluble relative permeability modifiers of the present invention. The aqueous injection fluid generally comprises an aqueous-based fluid and additional additives. The aqueous-based fluid may comprise fresh water, salt water (e.g., water containing one or more salts, such as potassium chloride, dissolved therein), brine (e.g., saturated salt water), produced water, or seawater. The additional additives present in the aqueous injection fluid may include any of a wide variety of additives that are typically used in injection operations that do not adversely react with the hydrophobically modified water-soluble polymers of the present invention.

Sufficient concentrations of the water-soluble relative permeability modifier should be present in the permeability-modifying injection fluids of the present invention to provide the desired level of diversion of aqueous injection fluids. In an exemplary embodiment, the water-soluble relative permeability modifier should be present in the permeability-modifying injection fluids of the present invention in an amount in the range of from about 0.02% to about 10% by weight of the permeability-modifying injection fluid. In an exemplary embodiment, the water-soluble relative permeability modifier should be present in the permeability-modifying injection fluids of the present invention in an amount in the range of from about 0.05% to about 1.0% by weight of the permeability-modifying injection fluid. In an exemplary embodiment of the present invention, the water-soluble relative permeability modifier may be provided in a concentrated aqueous solution prior to its combination with the aqueous injection fluid to form the permeability-modifying injection fluid.

The permeability-modifying injection fluids of the present invention may be prepared by any suitable method. In an exemplary embodiment, the water-soluble relative permeability modifiers may be metered into an existing injection stream comprising an aqueous injection fluid to form the permeability-modifying injection fluids of the present invention that is injected into the subterranean formation. Among other things, this may allow treatment of the subterranean formation with the water-soluble relative permeability modifiers without substantial interruption of an ongoing injection operation.

Sufficient volumes of the permeability-modifying injection fluids may be injected into the subterranean formation via an injection well penetrating the formation to achieve the desired level of diversion of aqueous injection fluids. The permeability-modifying injection fluids may flow through the areas of least resistance, e.g., the high permeability zones, thereby bypassing less permeable zones. It is believed that the water-soluble relative permeability modifier present in the permeability-modifying injection fluids, among other things, may attach to surfaces within the formation and reduce the permeability of the treated zones to aqueous-based fluids. Generally, after the desired volume of the permeability-modifying injection fluid is injected, the injection operation may proceed with injection of only aqueous injection fluids. The volume of the permeability-modifying injection fluids to inject into the formation will be based, inter alia, on several properties of the zone to be treated, such as depth and volume of the zone, as well as the permeability and other physical properties of the material in the zone. One of ordinary skill in the art, with the benefit of this disclosure, will be able to determine the desired volume of the permeability-modifying injection fluid to inject for a chosen application.

In an exemplary embodiment of the present invention, an oxidizer may be injected into the formation after the permeability-modifying injection fluid to restore the formation's original permeability. Among other things, the oxidizer may remove the water-soluble relative permeability modifier from surfaces within the formation where the water-soluble relative permeability modifier may have penetrated undesirable zones.

In another embodiment of the present invention, the water-soluble relative permeability modifier may be provided in a treatment fluid comprising an aqueous-based fluid and the water-soluble relative permeability modifier. Additional additives suitable for use in subterranean treatment fluids may be added to the treatment fluids of the present invention as desired.

The aqueous-based fluid used in the treatment fluids of the present invention can be fresh water, salt water (e.g., water containing one or more salts, such as potassium chloride, dissolved therein), brine (e.g., saturated salt water), produced water, or seawater. Generally, the aqueous-based fluid may be any aqueous liquid provided that it does not adversely react with the other components of the treatment fluids.

Sufficient concentrations of the water-soluble relative permeability modifier should be present in the treatment fluids of the present invention to provide the desired level of diversion of aqueous injection fluids. In an exemplary embodiment, the water-soluble relative permeability modifier generally should be present in the treatment fluids of the present invention in an amount in the range of from about 0.02% to about 10% by weight of the treatment fluid. In an exemplary embodiment, the water-soluble relative permeability modifier should be present in the treatment fluids of the present invention in an amount in the range of from about 0.05% to about 1.0% by weight of the treatment fluid.

Sufficient volumes of the treatment fluids may be injected into the subterranean formation via an injection well penetrating the formation to achieve the desired level of diversion of aqueous injection fluids. Generally, the treatment fluid is mixed in a batch process and injected into the formation after injection of an aqueous injection fluid is ceased. The treatment fluids may flow through the areas of least resistance, e.g., the high permeability zones, thereby bypassing less permeable zones. It is believed that the water-soluble relative permeability modifier present in the treatment fluids, among other things, may attach to surfaces within the formation and reduce the permeability of the treated zones to aqueous-based fluids. Generally, after the desired volume of the treatment fluid is injected into the formation, the injection operation may proceed with injection of the aqueous injection fluids. The volume of the treatment fluids to inject into the formation will be based, inter alia, on several properties of the zone to be treated, such as depth and volume of the zone, as well as the permeability and other physical properties of the material in the zone. One of ordinary skill in the art, with the benefit of this disclosure, will be able to determine the desired volume of the treatment fluids to inject for a chosen application.

Moreover, in an exemplary embodiment, after the treatment fluids of the present invention are injected in the subterranean formation, an after-flush of a hydrocarbon liquid, such as kerosene, diesel oil or crude oil, or a hydrocarbon or inert gas, such as methane and natural gas or nitrogen (when the formation produces gas), optionally may be introduced into the formation.

In an exemplary embodiment of the present invention, an oxidizer may be injected into the formation after the treatment fluid to restore the formation's original permeability. Among other things, the oxidizer may remove the water-soluble relative permeability modifier from surfaces within the formation where the water-soluble relative permeability modifier may have penetrated undesirable zones.

In another embodiment of the present invention, the water-soluble relative permeability modifier present in the treatment fluids of the present invention may be formed by the in situ reaction between a hydrophilic polymer and a hydrophobic compound. Where this reaction occurs in situ, the treatment fluids of the present invention generally comprise an aqueous-based fluid, a hydrophilic polymer, a hydrophobic compound, a surfactant, and an optional pH-adjusting agent. Additional additives suitable for use in subterranean operations may be added to the treatment fluids of the present invention as desired.

The aqueous-based fluid used in the treatment fluids in the in situ reaction embodiments of the present invention can be fresh water, salt water (e.g., water containing one or more salts, such as potassium chloride, dissolved therein), brine (e.g., saturated salt water), produced water, or seawater. Generally, the aqueous-based fluid may be any aqueous liquid provided that it does not adversely affect the other components of the treatment fluids.

The hydrophilic polymers used in the in situ reaction embodiments may be the same as those described above. The hydrophilic polymers, in the in situ reaction embodiments of the present invention, should be present in the treatment fluids in an amount sufficient to provide the desired level of diversion of aqueous injection fluids. In an exemplary embodiment, the hydrophilic polymer is present in the treatment fluids of the present invention in an amount in the range of from about 0.1% to about 10% by weight of the treatment fluid. In an exemplary embodiment, the hydrophilic polymer is present in the treatment fluids of the present invention in an amount in the range of from about 0.2% to about 1.5% by weight of the treatment fluid.

The hydrophobic compounds used in the in situ reaction embodiments may be the same as those described above. The hydrophobic compounds, in the in situ reaction embodiments of the present invention, should be present in the treatment fluids in an amount sufficient to provide the desired level of diversion of aqueous injection fluids. In an exemplary embodiment, the hydrophobic compound is present in the treatment fluids of the present invention in an amount in the range of from about 0.01% to about 5% by weight of the treatment fluid. In an exemplary embodiment, the hydrophobic compound is present in the treatment fluids of the present invention in an amount in the range of from about 0.02% to about 0.5% by weight of the treatment fluid.

In the in situ reaction embodiments of the present invention, due to the insolubility of hydrophobic compounds in aqueous fluids, a surfactant may be present in the treatment fluids. The surfactant may be selected, inter alia, for its ability to potentially promote the dissolution of the hydrophobic compounds in the treatment fluids of the present invention. The surfactant may be anionic, cationic, amphoteric, or neutral. Thus, surfactants suitable for use in the current invention include, but are not limited to, alkyl ammonium surfactants, betaines, alkyl ether sulfates, alkyl ether sulfonates, and ethoxylated alcohols. Generally, the surfactant is added to the treatment fluids of the present invention in an amount so that the hydrophobic compound disperses in the treatment fluids. In an exemplary embodiment, the surfactant is present in the treatment fluids of the present invention in an amount in the range of from about 0.1% to about 2% by weight of the treatment fluid.

Optionally in the in situ reaction embodiments, the treatment fluids of the present invention, may comprise a pH-adjusting agent. The pH-adjusting agent may facilitate the in situ reaction between the hydrophilic polymer and the hydrophobic compound by providing a pH of about 8 or higher in the treatment fluid. Examples of suitable pH-adjusting agents include buffers, alkali metal hydroxides, alkali metal carbonates, alkali metal phosphates, and other similar compounds known by those skilled in the art.

Depending on certain well bore and formation conditions, a shut-in period of up to about several hours may be required after injection of the treatment fluid to permit the in situ reaction between the hydrophilic polymer and the hydrophobic compound. During the shut-in period, the hydrophilic polymer and the hydrophobic polymer react to form the hydrophobically modified water-soluble polymer. Generally, the length of the well bore and the downhole temperature should determine the length of any shut-in period. For example, a deep well bore with temperatures greater than or equal to about 200° F. may not require a shut-in period. Moreover, shallower, cooler formations may require longer shut-in periods that may extend up to about 24 hours. Those skilled in the art will be able to readily determine the necessity for, and duration of, any shut-in periods that may be useful to permit the appropriate in situ reaction.

In another embodiment of the present invention, the water-soluble relative permeability modifiers present in the treatment fluids of the present invention may be formed by the in situ reaction between a hydrophilic polymer and a hydrophilic compound. Where this reaction occurs in situ, the treatment fluids of the present invention generally comprise an aqueous-based fluid, a hydrophilic polymer, a hydrophilic compound, and an optional pH-adjusting agent. Additional additives suitable for use in subterranean operations may be added to the treatment fluids of the present invention as desired.

The aqueous-based fluids, hydrophilic polymers, hydrophilic compounds, and pH-adjusting agents suitable for use in these treatment fluids may be the same as those described above.

The hydrophilic polymers, in the in situ reaction embodiments of the present invention, should be present in the treatment fluids in an amount sufficient to provide the desired level of diversion of aqueous injection fluids. In an exemplary embodiment, the hydrophilic polymer is present in the treatment fluids of the present invention in an amount in the range of from about 0.1% to about 10% by weight of the treatment fluid. In an exemplary embodiment, the hydrophilic polymer is present in the treatment fluids of the present invention in an amount in the range of from about 0.2% to about 1.5% by weight of the treatment fluid.

The hydrophilic compounds, in the in situ reaction embodiments of the present invention, should be present in the treatment fluids in an amount sufficient to provide the desired level of diversion of aqueous injection fluids. In an exemplary embodiment, the hydrophilic compound is present in the treatment fluids of the present invention in an amount in the range of from about 0.01% to about 5% by weight of the treatment fluid. In an exemplary embodiment, the hydrophilic compound is present in the treatment fluids of the present invention in an amount in the range of from about 0.02% to about 0.5% by weight of the treatment fluid.

Depending on certain well bore and formation conditions, a shut-in period of up to about several hours may be required after injection of the treatment fluid to permit the in situ reaction between the hydrophilic polymer and the hydrophilic compound. During the shut-in period, the hydrophilic polymer and the hydrophilic compound react to form the hydrophilically modified water-soluble polymer. Generally, the length of the well bore and the downhole temperature should determine the length of any shut-in period. For example, a deep well bore with temperatures greater than or equal to about 200° F. may not require a shut-in period. Moreover, shallower, cooler formations may require longer shut-in periods that may extend up to about 24 hours. Those skilled in the art will be able to readily determine the necessity for, and duration of, any shut-in periods that may be useful to permit the appropriate in situ reaction.

An exemplary method of the present invention for performing an injection operation comprises: introducing a water-soluble relative permeability modifier comprising a hydrophobically modified water-soluble polymer into a subterranean formation; and injecting an aqueous injection fluid into the subterranean formation after introducing the water-soluble relative permeability modifier.

Another exemplary method of the present invention for performing an injection operation comprises: introducing a water-soluble relative permeability modifier comprising a hydrophilically modified water-soluble polymer into a subterranean formation; and injecting an aqueous injection fluid into the subterranean formation after introducing the water-soluble relative permeability modifier.

Another exemplary method of the present invention for performing an injection operation comprises: providing a water-soluble relative permeability modifier comprising a water-soluble polymer without hydrophobic or hydrophilic modification; introducing the water-soluble relative permeability modifier into a subterranean formation; and injecting an aqueous injection fluid into the subterranean formation after introducing the water-soluble relative permeability modifier.

An exemplary embodiment of a permeability-modifying treatment fluid of the present invention comprises a water-soluble relative permeability modifier comprising a hydrophobically modified water-soluble polymer.

Another exemplary embodiment of a permeability-modifying treatment fluid of the present invention comprises a water-soluble relative permeability modifier comprising a hydrophilically modified water-soluble polymer.

Another exemplary embodiment of a permeability-modifying treatment fluid of the present invention comprises a water-soluble polymer without hydrophilic or hydrophobic modification.

To facilitate a better understanding of the present invention, the following examples of the preferred embodiments are given. In no way should the following examples be read to limit, or define, the scope of the invention.

EXAMPLES

A fluid diversion test was performed using a "parallel" core set up. In the parallel set up, a High Permeability core (a Brown Sandstone Core) and a Low Permeability core (a Berea core) were connected in parallel so that a sample fluid has equal opportunity to enter either core. This test was conducted at 175° F. This test was conducted using a brine containing 9% sodium chloride and 1% calcium chloride by weight.

The sample fluid used in this test comprised 2000 ppm of a hydrophobically modified water-soluble polymer dissolved in a 2% potassium chloride solution by weight. The hydrophobically modified water-soluble polymer was a dimethylaminoethyl methacrylate/hexadecyldimethylamrnmonium-ethyl methacrylate bromide copolymer.

The following procedure was used for this test, the results of which are provided in Table 1. The High Permeability core was taken to residual oil saturation by flowing a sequence of brine-oil-brine. The Low Permeability core was taken to residual water saturation by flowing a sequence of brine-oil-brine-oil. The cores were then connected in parallel set up, and the sample fluid was pumped into the two cores, wherein 93% of the sample fluid entered the High Permeability core and 7% of the sample fluid entered the Low Permeability core. Next, an overflush of a 5% ammonium chloride solution by weight was pumped into the two cores in the parallel set up, wherein 0% of the ammonium chloride solution entered the High Permeability core and 100% of the ammonium chloride solution entered the Low Permeability core. The results of the test are provided below in Table 1.

TABLE 1

|  | % of Sample Fluid Entering Core | % of Overflush Entering Core |
| --- | --- | --- |
| High Permeability core | 93% | 0% |
| Low Permeability core | 7% | 100% |

This example indicates, inter alia, that a hydrophobically modified water-soluble polymer used in the permeability-modifying injection fluids (and/or treatment fluids) of the present invention may reduce the permeability of a formation to aqueous-based fluids.

Therefore, the present invention is well adapted to carry out the objects and attain the ends and advantages mentioned as well as those which are inherent therein. While numerous changes may be made by those skilled in the art, such changes are encompassed within the spirit of this invention as defined by the appended claims.

What is claimed is:

1. A method comprising:
performing an injection operation in a subterranean formation penetrated by at least one injection well and at least one production well, wherein the injection operation comprises:
introducing a water-soluble relative permeability modifier comprising a hydrophobically modified water-soluble polymer through at least one injection well into a first zone of the subterranean formation having a permeability to aqueous-based fluids so that the hydrophobically modified water-soluble polymer reduces the permeability of the first zone of the subterranean formation to aqueous-based fluids, wherein the hydrophobically modified water-soluble polymer has a molecular weight in the range of about 100,000 to about 10,000,000 once synthesized and comprises a polymer backbone and a hydrophobic branch, the hydrophobic branch comprising an organic acid derivative selected from the group consisting of: an anhydride of octenyl succinic acid, an ester of octenyl succinic acid, an amide of octenyl succinic acid, an anhydride of dodecenyl succinic acid, an ester of dodecenyl succinic acid, and an amide of dodecenyl succinic acid; and
injecting an aqueous injection fluid through at least one injection well into the first zone of the subterranean formation after introducing the water-soluble relative permeability modifier so that the hydrophobically modified water-soluble polymer present in the first zone of the subterranean formation diverts at least a portion of the aqueous injection fluid to a second zone of the subterranean formation.

2. The method of claim 1 wherein the hydrophobically modified water-soluble polymer comprises a polymer backbone comprising polar heteroatoms.

3. The method of claim 2 wherein the polar heteroatoms present within the polymer backbone of the hydrophobically modified water-soluble polymer comprise at least one atom selected from the group consisting of: oxygen, sulfur, and phosphorous.

4. The method of claim 1 wherein the hydrophobically modified water-soluble polymer is a reaction product of a hydrophilic polymer and a hydrophobic compound.

5. The method of claim 4 wherein the hydrophilic polymer comprises a polymer backbone comprising polar heteroatoms.

6. The method of claim 5 wherein the hydrophilic polymer comprises at least one polymer selected from the group consisting of: a cellulose, a chitosan, a polyamide, a polyetheramine, a polyethyleneimine, a polyhydroxyetheramine, a polylysine, a polysulfone, and a starch.

7. The method of claim 4 wherein the hydrophobic compound has an alkyl chain length of about 4 to about 22 carbons.

8. The method of claim 1 wherein the hydrophobically modified water-soluble polymer is prepared from a polymerization reaction of at least one hydrophilic monomer and at least one hydrophobically modified hydrophilic monomer.

9. The method of claim 8 wherein the mole ratio of the hydrophilic monomer to the hydrophobically modified hydrophilic monomer in the hydrophobically modified water-soluble polymer is in the range of about 99.98:0.02 to about 90:10.

10. The method of claim 1 wherein the water-soluble relative permeability modifier is introduced into the first zone of the subterranean formation by injecting a permeability-modifying injection fluid comprising an aqueous injection fluid and the water-soluble relative permeability modifier into the first zone of the subterranean formation.

11. The method of claim 10 wherein the water-soluble relative permeability modifier is present in the permeability-modifying injection fluid in an amount in the range of about 0.02% to about 10% by weight of the permeability-modifying injection fluid.

12. The method of claim 10 wherein the permeability-modifying injection fluid was formed by metering the water-soluble relative permeability modifier into an existing injection stream comprising the aqueous injection fluid to form the permeability-modifying injection fluid.

13. The method of claim 1 wherein the water-soluble relative permeability modifier is introduced into the first zone of the subterranean formation by injecting a treatment fluid comprising the water-soluble relative permeability modifier into the first zone of the subterranean formation.

14. The method of claim 13 wherein the water-soluble relative permeability modifier is present in the treatment fluid in an amount in the range of about 0.02% to about 10% by weight of the treatment fluid.

15. The method of claim 4 wherein the hydrophilic polymer comprises a dialkyl amino pendant group.

16. The method of claim 4 wherein the hydrophilic polymer comprises a dimethyl amino pendant group and at least one monomer selected from the group consisting of: dimethylaminoethyl methacrylate and dimethylaminopropyl methacrylamide.

17. The method of claim 4 wherein the hydrophilic polymer comprises at least one polymer selected from the group consisting of: a polyvinylamine, a poly(vinylamine/vinyl alcohol), and an alkyl acrylate polymer.

18. The method of claim 4 wherein the hydrophilic polymer comprises at least one polymer selected from the group consisting of: polydimethylaminoethyl methacrylate, polydimethylaminopropyl methacrylamide, poly(acrylamide/dimethylaminoethyl methacrylate), poly(acrylic acid/dimethylaminoethyl methacrylate), poly(methacrylic acid/dimethylaminoethyl methacrylate), poly(2-acrylamido-2-methyl propane sulfonic acid/dimethylaminoethyl methacrylate), poly(acrylamide/dimethylaminopropyl methacrylamide), poly(acrylic acid/dimethylaminopropyl methacrylamide), and poly(methacrylic acid/dimethylaminopropyl methacrylamide).

19. The method of claim 8 wherein the hydrophilic monomer comprises at least one monomer selected from the group consisting of: acrylamide, 2-acrylamido-2-methyl propane sulfonic acid, N,N-dimethylacrylamide, vinyl pyrrolidone, dimethylaminoethyl methacrylate, acrylic acid, dimethylaminopropylmethacrylamide, vinyl amine, vinyl acetate, trimethylammoniumethyl methacrylate chloride, methacrylamide, hydroxyethyl acrylate, vinyl sulfonic acid, vinyl phosphonic acid, methacrylic acid, vinyl caprolactam, N-vinylformamide, N,N-diallylacetamide, dimethyldiallyl ammonium halide, itaconic acid, styrene sulfonic acid, methacrylamidoethyltrimethyl ammonium halide, a quaternary salt derivative of acrylamide, and a quaternary salt derivative of acrylic acid.

20. The method of claim 8 wherein the hydrophobically modified hydrophilic monomer comprises at least one monomer selected from the group consisting of: an alkyl acrylate, an alkyl methacrylate, an alkyl acrylamide, an alkyl methacrylamide, an alkyl dimethylammoniumethyl methacrylate halide, and an alkyl dimethylammoniumpropyl methacrylamide halide, wherein the alkyl groups have from about 4 to about 22 carbon atoms.

21. A method comprising:
performing an injection operation in a subterranean formation penetrated by at least one injection well and at least one production well, wherein the injection operation comprises:
introducing a relative permeability modifier comprising a hydrophobically modified water-soluble polymer through at least one injection well into a first zone of the subterranean formation having a permeability to aqueous-based fluids, wherein the hydrophobically modified water-soluble polymer comprises a polymer backbone and an amino pendant group quaternized to include a hydrophobic branch, the hydrophobic branch comprising an alkyl group of from about 4 carbons to 22 carbons without any intervening heteroatoms, and wherein the hydrophobically modified polymer reduces the permeability of first zone of the subterranean formation to aqueous-based fluids without substantially reducing a permeability of the first zone of the subterranean formation to hydrocarbons; and
introducing an aqueous injection fluid through at least one injection well into the first zone of the subterranean formation, wherein the hydrophobically modified water-soluble polymer present in the first zone of the subterranean formation diverts at least a portion of the aqueous injection fluid to a second zone of the subterranean formation so that the aqueous injection fluid drives hydrocarbons present in the second zone of the subterranean formation to at least one production well.

22. The method of claim 21 wherein the hydrophobically modified water-soluble polymer is a reaction product of a hydrophilic polymer and a hydrophobic compound.

23. The method of claim 22 wherein the hydrophilic polymer comprises a dialkyl amino pendant group.

24. The method of claim 22 wherein the hydrophilic polymer comprises a dimethyl amino pendant group and at least one monomer selected from the group consisting of: dimethylaminoethyl methacrylate and dimethylaminopropyl methacrylamide.

25. The method of claim 22 wherein the hydrophilic polymer comprises at least one polymer selected from the group consisting of: a polyvinylamine, a poly(vinylamine/vinyl alcohol), and an alkyl acrylate polymer.

26. The method of claim 22 wherein the hydrophilic polymer comprises at least one polymer selected from the group consisting of: polydimethylaminoethyl methacrylate, polydimethylaminopropyl methacrylamide, poly(acrylamide/dimethylaminoethyl methacrylate), poly(acrylic acid/dimethylaminoethyl methacrylate), poly(methacrylic acid/dimethylaminoethyl methacrylate), poly(2-acrylamido-2-methyl propane sulfonic acid/dimethylaminoethyl methacrylate), poly(acrylamide/dimethylaminopropyl methacrylamide), poly(acrylic acid/dimethylaminopropyl methacrylamide), and poly(methacrylic acid/dimethylaminopropyl methacrylamide).

27. The method of claim 22 wherein the hydrophilic polymer comprises at least one polymer selected from the group consisting of: a cellulose, a chitosan, a polyamide, a polyetheramine, a polyethyleneimine, a polyhydroxyetheramine, a polylysine, a polysulfone, and a starch.

28. The method of claim 22 wherein the hydrophobic compound has an alkyl chain length of about 4 to about 22 carbons.

29. The method of claim 21 wherein the hydrophobically modified water-soluble polymer is prepared from a polymerization reaction of at least one hydrophilic monomer and at least one hydrophobically modified hydrophilic monomer.

30. The method of claim 29 wherein the hydrophilic monomer comprises at least one monomer selected from the group consisting of: acrylamide, 2-acrylamido-2-methyl propane sulfonic acid, N,N-dimethylacrylamide, vinyl pyrrolidone, dimethylaminoethyl methacrylate, acrylic acid, dimethylaminopropylmethacrylamide, vinyl amine, vinyl acetate, trimethylammoniumethyl methacrylate chloride, methacrylamide, hydroxyethyl acrylate, vinyl sulfonic acid, vinyl phosphonic acid, methacrylic acid, vinyl caprolactam, N-vinylformamide, N,N-diallylacetamide, dimethyldiallyl ammonium halide, itaconic acid, styrene sulfonic acid, methacrylamidoethyltrimethyl ammonium halide, a quaternary salt derivative of acrylamide, and a quaternary salt derivative of acrylic acid.

31. The method of claim 29 wherein the hydrophobically modified hydrophilic monomer comprises at least one monomer selected from the group consisting of: an alkyl acrylate, an alkyl methacrylate, an alkyl acrylamide, an alkyl methacrylamide, an alkyl dimethylammoniumethyl methacrylate halide, and an alkyl dimethylammoniumpropyl methacrylamide halide, wherein the alkyl groups have from about 4 to about 22 carbon atoms.

32. The method of claim 29 wherein the mole ratio of the hydrophilic monomer to the hydrophobically modified hydrophilic monomer in the hydrophobically modified water-soluble polymer is in the range of about 99.98:0.02 to about 90:10.

33. The method of claim 21 wherein the water-soluble relative permeability modifier is introduced into the first zone of the subterranean formation by injecting a permeability-modifying injection fluid comprising an aqueous injection fluid and the water-soluble relative permeability modifier into the first zone of the subterranean formation.

34. The method of claim 33 comprising metering the water-soluble relative permeability modifier into an existing injection stream comprising the aqueous injection fluid to form the permeability-modifying injection fluid.

35. The method of claim 21 wherein the water-soluble relative permeability modifier is introduced into the first zone of the subterranean formation by injecting a treatment fluid comprising the water-soluble relative permeability modifier into the first zone of the subterranean formation.

36. A method comprising:
performing an injection operation in a subterranean formation penetrated by at least one injection well and at least one production well, the injection operation comprises:
introducing a hydrophobically modified water-soluble polymer through an injection well into a first zone of the subterranean formation having a permeability to aqueous-based fluids, wherein the hydrophobically modified water-soluble polymer has a molecular weight in the range of about 100,000 to about 10,000,000 once synthesized, wherein the hydrophobically modified water-soluble polymer comprises a polymer backbone and a hydrophobic branch, the hydrophobic branch comprising an organic acid derivative selected from the group consisting of: an anhydride of octenyl succinic acid, an ester of octenyl succinic acid, an amide of octenyl succinic acid, an anhydride of dodecenyl succinic acid, an ester of dodecenyl succinic acid, and an amide of dodecenyl succinic acid, and wherein the hydrophobically modified water-soluble polymer reduces the permeability of the first zone of the subterranean formation to aqueous-based fluids; and
introducing an aqueous injection fluid through an injection well into the first zone of the subterranean formation.

37. The method of claim 36 wherein the hydrophobically modified water-soluble polymer comprises a polymer backbone comprising polar heteroatoms.

38. The method of claim 37 wherein the polar heteroatoms present within the polymer backbone of the hydrophobically modified water-soluble polymer comprise at least one atom selected from the group consisting of: oxygen, sulfur, and phosphorous.

39. The method of claim 36 wherein the hydrophobically modified water-soluble polymer is a reaction product of a hydrophilic polymer and a hydrophobic compound.

40. The method of claim 36 wherein the hydrophilic polymer comprises a dialkyl amino pendant group.

41. The method of claim 36 wherein the hydrophilic polymer comprises a dimethyl amino pendant group and at least one monomer selected from the group consisting of dimethylaminoethyl methacrylate and dimethylaminopropyl methacrylamide.

42. The method of claim 36 wherein the hydrophilic polymer comprises at least one polymer selected from the group consisting of: a polyvinylamine, a poly(vinylamine/vinyl alcohol), and an alkyl acrylate polymer.

43. The method of claim 36 wherein the hydrophilic polymer comprises at least one polymer selected from the group consisting of: polydimethylaminoethyl methacrylate, polydimethylaminopropyl methacrylamide, poly(acrylamide/dimethylaminoethyl methacrylate), poly(acrylic acid/dimethylaminoethyl methacrylate), poly(methacrylic acid/ dimethylaminoethyl methacrylate), poly(2-acrylamido-2-methyl propane sulfonic acid/dimethylaminoethyl methacrylate), poly(acrylamide/dimethylaminopropyl methacrylamide), poly(acrylic acid/dimethylaminopropyl methacrylamide), and poly(methacrylic acid/dimethylaminopropyl methacrylamide).

44. The method of claim 39 wherein the hydrophilic polymer comprises at least one polymer selected from the group consisting of: a cellulose, a chitosan, a polyamide, a polyetheramine, a polyethyleneimine, a polyhydroxyetheramine, a polylysine, a polysulfone, and a starch.

45. The method of claim 39 wherein the hydrophobic compound has an alkyl chain length of about 4 to about 22 carbons.

46. The method of claim 36 wherein the hydrophobically modified water-soluble polymer is prepared from a polymerization reaction of at least one hydrophilic monomer and at least one hydrophobically modified hydrophilic monomer.

47. The method of claim 38 wherein the hydrophilic monomer comprises at least one monomer selected from the group consisting of: acrylamide, 2-acrylamido-2-methyl propane sulfonic acid, N,N-dimethylacrylamide, vinyl pyrrolidone, dimethylaminoethyl methacrylate, acrylic acid, dimethylaminopropylmethacrylamide, vinyl amine, vinyl acetate, trimethylammoniumethyl methacrylate chloride, methacrylamide, hydroxyethyl acrylate, vinyl sulfonic acid, vinyl phosphonic acid, methacrylic acid, vinyl caprolactam, N-vinylformamide, N,N-diallylacetamide, dimethyldiallyl ammonium halide, itaconic acid, styrene sulfonic acid, methacrylamidoethyltrimethyl ammonium halide, a quaternary salt derivative of acrylamide, and a quaternary salt derivative of acrylic acid.

48. The method of claim 46 wherein the hydrophobically modified hydrophilic monomer comprises at least one monomer selected from the group consisting of: an alkyl acrylate, an alkyl methacrylate, an alkyl acrylamide, an alkyl methacrylamide, an alkyl dimethylammoniumethyl methacrylate halide, and an alkyl dimethylammoniumpropyl methacrylamide halide, wherein the alkyl groups have from about 4 to about 22 carbon atoms.

49. The method of claim 46 wherein the mole ratio of the hydrophilic monomer to the hydrophobically modified hydrophilic monomer in the hydrophobically modified water-soluble polymer is in the range of about 99.98:0.02 to about 90:10.

50. The method of claim 36 wherein the hydrophobically modified water-soluble polymer present in the first zone of the subterranean formation diverts the aqueous injection fluid to a second zone of the subterranean formation.

51. The method of claim 36, wherein the hydrophobically modified water-soluble polymer is water soluble.

52. The method of claim 21, wherein the relative permeability modifier is water soluble.

53. The method of claim 1 wherein the hydrophobically modified water-soluble polymer comprises an amino pendant group quaternized to include the hydrophobic branch.

54. The method of claim 36 wherein the hydrophobically modified water-soluble polymer comprises an amino pendant group quaternized to include the hydrophobic branch.

55. The method of claim 21 wherein the amino pendant group comprises a dialkyl amino pendant group.

56. The method of claim 53 wherein the amino pendant group comprises a dialkyl amino pendant group.

57. The method of claim 54 wherein the amino pendant group comprises a dialkyl amino pendant group.

* * * * *